US 6,634,532 B1

(12) United States Patent
Maguire

(10) Patent No.: US 6,634,532 B1
(45) Date of Patent: Oct. 21, 2003

(54) CAR MAP HOLDER

(76) Inventor: Martha E. Maguire, 10453 Artesia Blvd., Apt. 19B, Bellflower, CA (US) 90706

( * ) Notice: Subject to any disclaimer, the term of this patent is extended or adjusted under 35 U.S.C. 154(b) by 40 days.

(21) Appl. No.: 09/991,606

(22) Filed: Nov. 23, 2001

(51) Int. Cl.[7] .................................................. B60R 7/06
(52) U.S. Cl. ......................... 224/483; 40/591; 40/593; 40/597; 40/904; 224/277; 224/281; 224/282
(58) Field of Search ................................. 224/483, 277, 224/281, 282, 551, 553, 559, 562; 248/150, 447, 460; 40/904, 597, 591, 593, 607

(56) References Cited

U.S. PATENT DOCUMENTS 4,271,616 A * 6/1981 Boykin ........................ 40/659
D318,298 S * 7/1991 Oren .......................... D19/88
5,579,969 A * 12/1996 Brandell ...................... 224/277
6,036,071 A * 3/2000 Hartmann et al. .......... 224/547

* cited by examiner

Primary Examiner—Lee Young
Assistant Examiner—Maerena W. Brevard

(57) ABSTRACT

A foldable map stand apparatus for automotive vehicles is set forth comprising a means for fastening the apparatus onto an automobile interior surface, a pivotally attached telescoping arm for adjusting the angle of display, and a holding means for receiving and displaying a portion of a map. The foldable map stand apparatus can be folded into a more collapsed form so that it may be stored in a more convenient location within the automobile when the map holder is not in use.

12 Claims, 2 Drawing Sheets

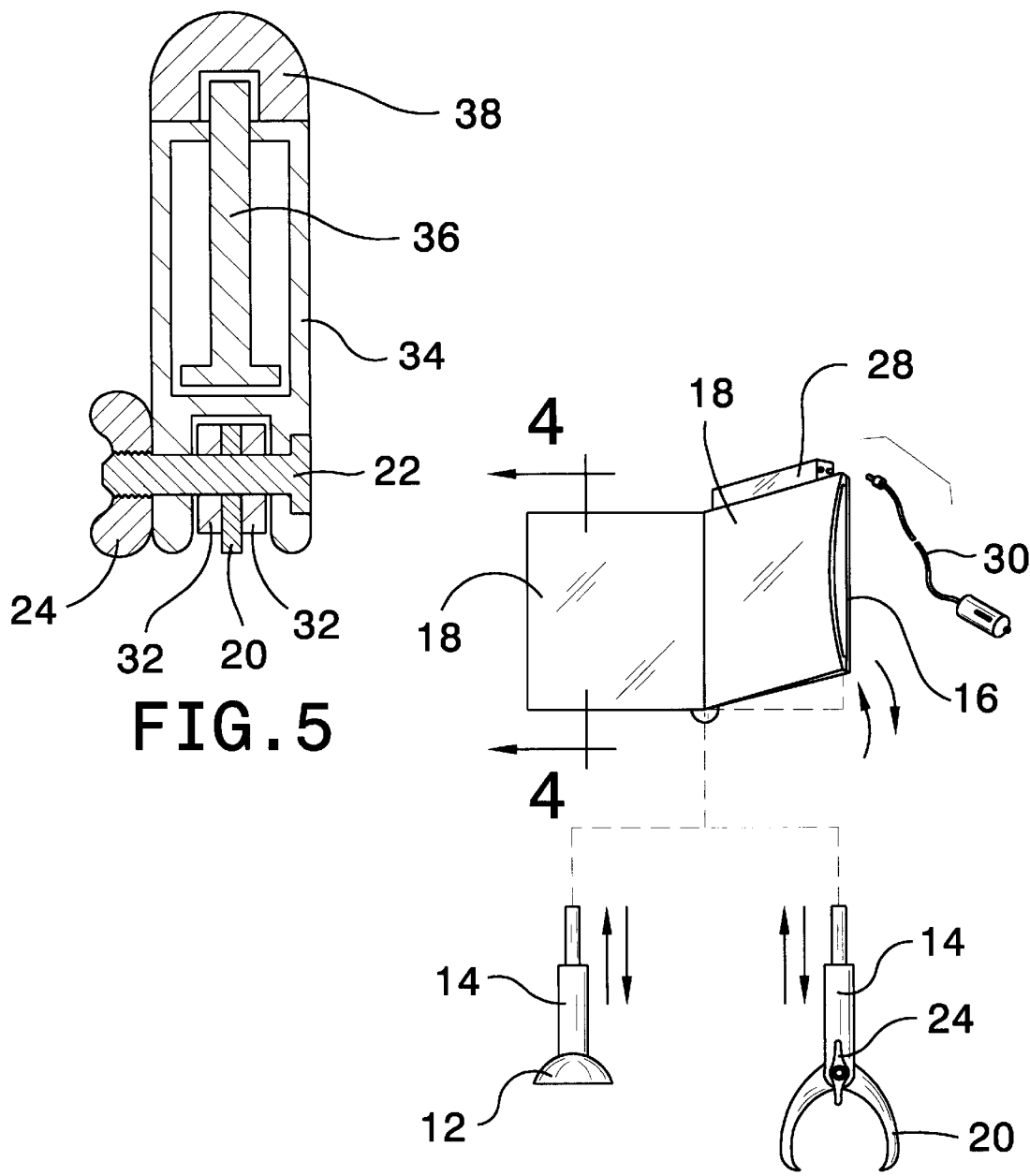

CAR MAP HOLDER

BACKGROUND OF THE INVENTION

1. Field of Invention

This invention is directed to map holders for use in road vehicles or the like and, more particularly, to a foldable map stand which allows positioning of the map holder within the interior of an automobile so that it is within the driver's field of view and allows for compact storage while not in use.

2. Background of the Invention

Using maps while attempting to steer an automobile through traffic can become problematic. An unsafe situation is likely to arise when the driver must pull the map from the glove compartment and open the map for viewing. At best, this type of maneuver is awkward and at worst this type of maneuver can lead to a serious automobile accident.

Various devices have been proposed for holding a map in place so that a driver can easily view it. However, a common problem with such map holders is that they are not oriented for easy use by a driver and they are not oriented towards compact storage while not in use. While the following examples of prior art all deal with these problems to some degree, they all tend to be either to impractical, complicated and time consuming to assemble and use, or not capable of being folded into a compact form for convenient storage.

Clipboards and associated types of rigid structures, such as the "Steering Wheel Desk" disclosed by Shaffert in U.S. Pat. No. D257,589, have been used in the past in association with automobiles for holding maps. However, it remains hazardous to look downwards to read a road map while one is driving an automobile. Moreover, the bulk of the cumbersome clipboard-type structure limits the driver's placement of the device within the interior of the automobile which results in either placing these types of devices at cumbersome angles so that viewing is difficult or placing these devices so that the drivers view is obstructed. Furthermore, these types of devices are also bulky and not easily removed and stored within an automobile.

The map holder disclosed by Shettleroe in U.S. Pat. No. 4,862,614 is a convenient portable telescoping collapsible map. However, this device suffers many of the same disadvantages as clipboards and associated types of rigid structures due to its cumbersome clipboard type shape. Furthermore, because of its' collapsible map apparatus, the Shettleroe device would require the driver to use both hands in unfurling the device and hence creating a driving hazard.

The map holder for automotive vehicles disclosed by Weiner in U.S. Pat. No. 4,071,174 may be easy to mount within an automobile as well as being adjustable to allow the driver to view the map. However, this device suffers the disadvantages of being cumbersome to use as well as being difficult to store. That is, the two convolution coil springs of Weiner's device restrict placement of this device within the interior of the automobile as well as require a relatively large area to store the device because it is impossible to reduce the size of this device beyond the diameter of these two convolution coil springs. Therefore, convenient storage of Weiners device, such as in a glove compartment, would be nearly impossible because of the large diameter os the two convolution coil springs which simply do not fold into a more compact area.

The map holder disclosed by Gunter in U.S. Pat. No. 5,044,588 enables easy map viewing but suffers from many of the same disadvantages experience in the use of clipboards and alike. That is, Gunter's device, due to the large rectangular shape, can create a road hazard when looking downwards to read a map while one is driving an automobile. Even though mounting Gunther's device within the interior of an automobile is achieved by hanging the device with two mounting brackets, a driver is likely to be forced to look away from the road at a cumbersome angle in order to inspect the suspended map. Finally, Gunter's device cannot be stored in a reduced area because of the rectangular shaped map holder does not fold.

The pad or map holding devices disclosed by Shim in U.S. Pat. No. 5,056,822 and disclosed by Faultich in U.S. Pat. No. 5,193,777 mount directly onto a steering wheel and hold a map within the diameter of the steering wheel. As a consequence, these types of steering wheel mounted devices have relatively limited utility because they can only display a restricted size of a given map. In addition, these types of steering wheel mounted devices may create a driving hazard when these devices unintentionally snag onto the drivers hands or sleeves. Furthermore, the maps themselves may contribute to a road hazard if the map is improperly mounted on the steering wheel in a manner that impairs the driver in controlling the steering wheel.

None of the above mentioned disclosed devices have adequately addressed the problems of designing a map holder that is relatively inexpensive, easy to unfold, convenient to mount a map, easy to position near or within the drivers' line of sight while simultaneously requiring a minimal amount of storage space so that the device can be conveniently stored in the glove compartment or under a seat when not in use. As such there is a need for a new and improved map holder apparatus which address both the problem of storage and effectivenes, and in this repsect the present invention substantially fulfills this need.

SUMMARY OF THE INVENTION

The apparatus of the present invention overcomes the above mentioned disadvantages and drawbacks which are characteristic of these aforementioned designs. More particularly, a preferred embodiment of the present invention comprises a foldable map apparatus which is easy to position within the interior of an automobile so that a portion of a map can be viewed near or within the driver's line of sight and requires a minimal amount for storage space because the device can be folded into a compact form for convenient storage.

In a preferred embodiment, the foldable map stand comprising a base having a fastening means for temporarily attaching said base to an interior surface of an automobile; a telescoping arm having a distal and a proximate end, wherein said distal end of said telescoping arm is pivotally connected to said base; and a map holder pivotally attached to said proximate end of said telescoping arm support, wherein said map holder comprising: a first and a second back panel, each having a top edge, a bottom edge, a rear surface, a right side, a left side, and a substantially planar front surface, wherein said left side of said first back panel is hingedly connected to said right side of said second back panel, wherein said first back panel is movable to an operational position where said first back panel front surface is substantially coplanar with said second back panel front surface, and wherein said left panel is movable to a folded position where said front surface of said left panel is substantially parallel to said front surface of said right panel, a first and a second transparent window, each having a top edge, a bottom edge, a left side, a right side, and a substantially planar back surface, wherein said first and second transparent windows are individually attached to said first and second back panels, respectively, so that said back surfaces of said first and second transparent windows are substantially parallel to said front surfaces of said first and second back panels, respectively, wherein said attachment of said first and second transparent windows to said first and second back panels, respectively, creates a means for mounting a map therebetween said back surfaces of said first and second transparent windows and said front surface of said first and second back panels, respectively, when said first back panel front surface is in said operational position by being substantially coplanar with said back panel front surface, so that, a portion of said map can be viewed through said first and second transparent windows in said operational position, and wherein said attachment of said first and second transparent windows to said first and second back panels, respectively creates a means for removing said map mounted therebetween said back surfaces of said first and second transparent windows and said front surface of said first and second back panels, respectively, wherein said left back panel can then be moved to said folded position where said front surface of said left panel is substantially parallel to said front surface of said right panel, so that said foldable map stand for compactly stored in said folded position.

BRIEF DESCRIPTION OF THE DRAWINGS

For a more complete understanding of the present invention and for further objects and advantages thereof, reference may now be had to the following description taken in conjunction with the accompanying drawings in which:

FIG. 3 is an exploded perspective view of a partially unfolded map stand device depicting two different bases.

FIG. 5 is a cross sectional lateral view of the telescoping arm.

DETAILED DISCLOSURE OF PREFERRED EMBODIMENTS

Figure 1:
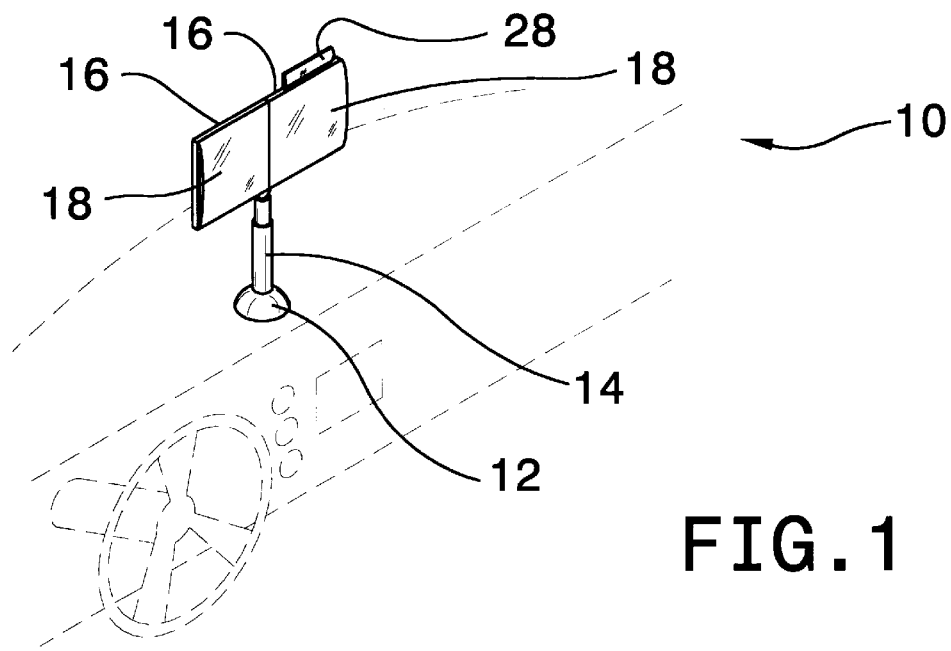
FIG. 1 is perspective view of an unfolded map stand device according to the present invention.

Although specific features of the invention are shown in some drawings and not others, this is for convenience only as each feature may be combined with any or all of the other features in accordance with the invention.

While preferred illustrative embodiments of the invention are described above, it will be apparent to those skilled in the art that various changes and modifications may be made without departing from the invention. The appended claims are intended to cover all changes within the spirit of the invention.

Referring now to the drawings, and particularly to FIGS. 1–5, a preferred embodiment of the foldable map stand device 10 of the present invention is shown and generally designed by the reference numeral 10. This preferred embodiment of the foldable map stand 10 comprises a suction cup base 12 for securely attaching the foldable map stand 10 onto an interior surface of an automobile. The suction cup base 12 is pivotally attached to the distal end of a telescopic arm 14 so that the securely mounted foldable map stand 10 may be aligned in its operational position by pivoting the telescoping arm 14 to any desirable angle chosen by the user. Also the pivotally attached telescopic arm 14 may be oriented by pivoting the telescopic arm 14 towards the suction cup base 12 into the folding position for compact storage of the foldable map stand 10. The telescoping arm 14 may also be extended along the proximate end of the telescoping arm during the operational position so that the user may optimize the desired operational position of the foldable map stand 10 mounted within the automobile. The telescoping arm 14 may also be distended in the folded position to further compact the foldable map stand 10 in the folded position by withdrawing the proximate end back into its' casing. The proximate end of the telescoping arm 14 is pivotally attached to the map holder that comprises at least two back panels 16 and the two transparent windows 18. The two back panels 16 are hingedly attached to one another along adjacent sides and two transparent windows 18 are separately to the two back panels 16, respectively. The back panels 16 may be hingedly moved to an operational position where the front surfaces of each back panel 16 substantially coplanar with one another for optimal viewing of the map when the map is mounted onto the front surfaces of the back panels 16. The back panels 16 can also be hingedly moved to a folded position where the front surfaces of the back panels 16 are substantially parallel to one another which significantly reduces the area of the folded map stand 10 for compact convenient storage. The top and bottom edges of the first and second transparent windows 18 are attached to the corresponding top and bottom edges of the first and second back panels 16, wherein creating a first and second cavity therebetween so that a map can be slidably inserted within the first and second cavities so the map can be held in the operational position and a portion of the map may be viewable through the first and second transparent windows 18. The first and second cavities are also capable of allowing slidable removal of a map held therebetween the first and second transparent windows 18 and said first and second back panels 16, so that the back panels 16 may be hingedly moved to the folded position. Thereby allowing the foldable map stand 10 to be compactly stored in any convenient location within an automobile.

Figure 4:
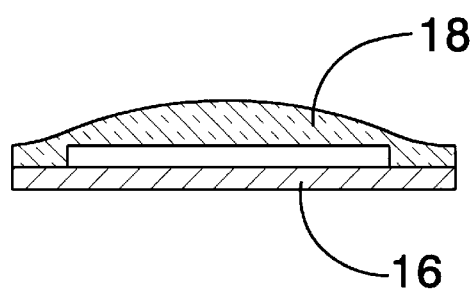
FIG. 4 is a cross sectional view showing a magnifying lens transparent window and back surface.

Referring now to FIG. 1, which is a perspective view of a preferred embodiment of the foldable map stand 10 having a suction cup base 12 for securing itself to an automobile internal surface. The distal end of a telescoping arm 14 is pivotally attached to the suction cup base 12 so that the telescoping arm 14 may be aligned to a desired angle chosen by the user. The proximate end of the telescoping arm 14 is pivotally attached to the map holder which comprises two base plates 16 and two transparent windows 18. In this preferred embodiment the base plates 16 are hingedly attached to one another along adjoining sides so that the base plates 16 may be hingedly moved to a substantially coplanar configuration for the operational position and the base plates 16 may also be hingedly moved to a folded position where the front surfaces of each base plate 16 faces each other, wherein reducing the overall area of the foldable map stand 10. In this preferred embodiment the top and bottom edges of the back surfaces of the transparent windows 18 are attached to the top and bottom edges of the front faces of the back panels 16, respectively, wherein creating a cavity therebetween the transparent windows 18 and the back panels 16 so that a map may be slidably slipped into or out of this cavity for holding the map in the corresponding operational or folded positions, respectively. FIG. 4 depicts a cross sectional cut away depicting this preferred embodiment showing the top and bottom edges of one of the transparent windows 18 attached to the top and bottom edges of the front surfaces of one of the back panels 16 wherein creating a cavity which is able to slidably receive and hold a map in the operational position of the foldable map stand 10.

Figure 2:
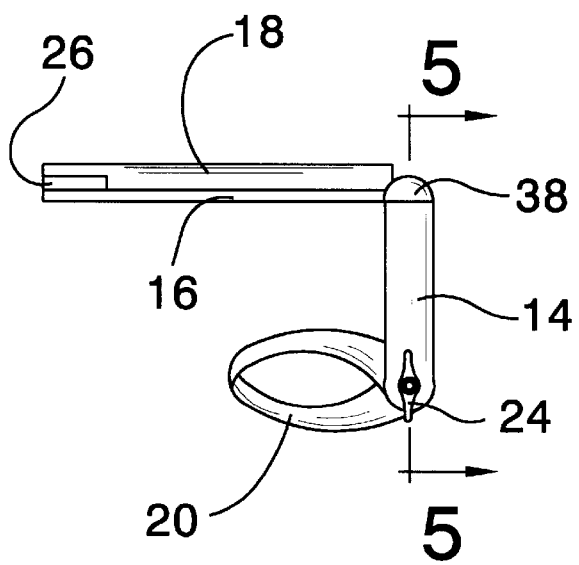
FIG. 2 is a lateral view of a folded map stand device.

Referring now to FIG. 2, a lateral view of another preferred embodiment of the folded map stand 10 device is shown. A claw clamp base 20 which is capable of being securely fastened to any number of interior surfaces found in any commercial automobile is pivotally attached to the distal end of the telescoping arm 14. The telescoping arm 14 can be moved substantially perpendicular to said claw clamp base 20 in the folded position of the folding map stand 10 as graphically depicted in FIG. 2. A user may also pivotably move the telescoping arm 14 to a desired angle to reach a desired operational position. Pivotally attached to the proximate end of the telescoping arm 14 is the back panel 16 of the map holder, wherein as shown in FIG. 2, the back panel 16 is movable to a folded position where the back panel 16 is substantially perpendicular to the telescoping arm 14. Thereby making a more compact form of the foldable map stand 10 for convenient storage. Also shown in FIG. 2 is a hinge 26 connected at the top edge of the back plates 16 that hingedly attaches to the top end of the transparent window 18. The hinge 26 allows the front surfaces of the back panels 16 and the back surfaces of the transparent windows 18 to be substantially parallel with one another (i.e., flush with one another) wherein a map can be mounted therebetween the back panels 16 and the transparent windows 18 in the operational position. A map can also be removed from therebetween the back panels and the transparent windows 18 by hingedly moving the transparent windows 18 away from the back panels 18 which allows a map to be removed or replaced with another map.

Referring now to FIG. 3 which is an exploded view of the foldable map stand 10 illustrating that either the suction cup base 12 or the claw clamp base 20 may be used as the base of the foldable map stand 10. In one of the preferred embodiments, the distal end of the telescoping arm 14 is attached to the suction cup base 12 and the proximate end of the telescoping arm 14 is pivotally attached to the map holder which comprises two transparent windows 18 attached at their top and bottom edges to their corresponding back plates 16. Also attached to the map holder is a light 28 and an electrical cord 30 for supplying power for providing illumination of the map during the operational position. The back plates 16 of the map holder are hingedly attached to one another along their adjacent connecting sides so that the back plates 16 are movable to either the operational position which is substantially a coplanar configuration of the base plates 16 which allows a map to slidably be inserted between the cavity therebetween the transparent windows 18 and the back plates 16. Upon slidable removal of the map from the cavity, the back plates 16 are movable to a foldable configuration where the front surfaces of the back plates 16 are substantially parallel with each other so that the storage area of the foldable map stand 10 is significantly diminished for conveniently storage.

Referring now to FIG. 4 depicts a cross sectional cut away of one preferred embodiment of how the back panels 16 are attached to the transparent windows 18. In this preferred embodiment the top and bottom edges of the transparent windows 18 are attached to the top and bottom edges of the front surfaces of the corresponding back panels 16, respectively, wherein a cavity is created which is able to accept and hold in place a map in the operational position of the foldable map stand 10. Also shown is a convex shaped front surface of the transparent window 18 that acts as a magnifying lens. The magnifying lens feature can also be a Fresnel lens as well as a conventional convex lens.

Referring now to FIG. 5 depicts a cross sectional view of one embodiment of the telescoping arm 14 illustrating the distal end composed of a collar 34 pivotally attached by a bolt 22 traversing the top part of the claw clamp base 20 (the entire claw clamp not shown). The bolt 22 holds two washers 32 between the top part of the claw clamp base 20 and the bolt 22 is held in place by a wing nut 24. The telescoping arm collar 32 contains a rod 36 that is capable of extending the total length of the telescoping arm 14. Attached to the top of the rod 36 is a pivot As head 38 for attachment to the map holder.

While a preferred embodiment of the map holder has been described in detail, it should be apparent that modifications and variations thereto are possible, all of which fall within the true spirit and scope of the invention. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foldable map stand comprising:

a base having a fastening means for temporarily attaching said base to an interior surface of an automobile;

a telescoping arm having a distal and a proximate end, wherein said distal end of said telescoping arm is pivotally connected to said base; and a map holder pivotally attached to said proximate end of said telescoping arm support, wherein said map holder comprises:

a first and a second back panel, each having a top edge, a bottom edge, a rear surface, a right side, a left side, and a substantially planar front surface, wherein said left side of said first back panel is hingedly connected to said right side of said second back panel, wherein said first back panel is movable to an operational position where said first back panel front surface is substantially coplanar with said second back panel front surface, and wherein said second back panel is movable to a folded position where said front surface of said second back panel is substantially parallel to said front surface of said first back panel, a first and a second transparent window, each having a top edge, a bottom edge, a left side, a right side, and a substantially planar back surface, wherein said first and second transparent windows are individually attached to said first and second back panels, respectively, so that said back surfaces of said first and second transparent windows are substantially parallel to said front surfaces of said first and second back panels, respectively, wherein said attachment of said first and second transparent windows to said first and second back panels, respectively, creates a means for mounting a map therebetween said back surfaces of said first and second transparent windows and said front surface of said first and second back panels, respectively, when said first back panel front surface is in said operational position by being substantially coplanar with said back panel front surface, so that, a portion of said map can be viewed through said first and second transparent windows in said operational position, and wherein said attachment of said first and second transparent windows to said first and second back panels, respectively, creates a means for removing said map mounted therebetween said back surfaces of said first and second transparent windows and said front surface of said first and second back panels, respectively, wherein said left back panel can then be moved to said folded position where said front surface of said second back panel is substantially parallel to said front surface of said first back panel, so that said foldable map stand is compactly stored in said folded position.

2. The foldable map stand as described in claim 1, wherein said top and bottom edges of said first and second transparent windows are attached to the corresponding top and bottom edges of said first and second back panels, respectively, wherein creating a first and second cavity therebetween said first and second transparent windows and said front surfaces of said first and second back panels, respectively, wherein said means for mounting said map is where said first and second cavity are capable of slidably accepting and holding said map when said first back panel front surface is substantially coplanar with said second back panel front surface in said operational position so that said portion of said map can be viewed through said first and second transparent windows when said map is held within said cavity, and wherein said means for removing said map is where said cavity is capable of allowing slidable removal of said map held therebetween first and second transparent windows and said first and second back panel front surfaces.

3. The foldable map stand as described in claim 1, wherein said top edges of said first and second transparent windows are hingedly attached to the corresponding top edges of said first and second back panels, respectively, wherein said first and second transparent window back surfaces are hingedly movable to an open position substantially perpendicular to said front surfaces of said first and second back panels, respectfully, to accept and to remove said map therebetween said first and second transparent windows and said front surfaces of said first and second back panels, respectively, and wherein said first and second transparent window back surfaces are hingedly movable to a position substantially parallel to said front surfaces of said first and second back panels, respectively, to hold in place said map therebetween said first and second transparent windows and said front surfaces of said first and second back panels, respectively.

4. The foldable map stand as described in claim 1, wherein said bottom edges of said first and second transparent windows are hingedly attached to the corresponding top edges of said first and second back panels, respectively, wherein said first and second transparent window back surfaces are hingedly movable to an open position substantially perpendicular to said front surfaces of said first and second back panels, respectfully, to accept and to remove said map therebetween said first and second transparent windows and said front surfaces of said first and second back panels, respectively, and wherein said first and second transparent window back surfaces are hingedly movable to a position substantially parallel to said front surfaces of said first and second back panels, respectively, to hold in place said map therebetween said first and second transparent windows and said front surfaces of said first and second back panels, respectively.

5. The foldable map stand as described in claim 1, wherein said first and second transparent windows are convex magnifying lens.

6. The foldable map stand as described in claim 1, wherein said first and second transparent windows are Fresnel magnifying lens.

7. The foldable map stand as described in claim 1, wherein said fastening means of said base is a suction cup.

8. The foldable map stand as described in claim 1, wherein said fastening means of said base is a claw clamp.

9. The foldable map stand as described in claim 1, wherein said fastening means of said base is a magnet.

10. The foldable map stand as described in claim 1, further comprising a light, having a power inlet, attached to said top edge of said right back panel for enhancing illumination of said portion of said map.

11. The foldable map stand as described in claim 10, further comprising a power cord, comprising a cigarette lighter adaptor electrically connected to a plug compatible to said power inlet of said light.

12. The foldable map stand as described in claim 10, further comprising a battery pack connected to said power inlet of said light.

* * * * *